(12) United States Patent
Dorfeld et al.

(10) Patent No.: US 8,127,572 B2
(45) Date of Patent: *Mar. 6, 2012

(54) METHOD OF ELIMINATING BLISTERS IN A GLASS MAKING PROCESS

(75) Inventors: William Gurney Dorfeld, Salida, CO (US); Adam James Gillmar Ellison, Painted Post, NY (US); Qiao Li, Horseheads, NY (US); Susan Lee Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,955

(22) Filed: Feb. 23, 2011

(65) Prior Publication Data

US 2011/0138858 A1 Jun. 16, 2011

Related U.S. Application Data

(62) Division of application No. 11/635,975, filed on Dec. 8, 2006.

(60) Provisional application No. 60/749,024, filed on Dec. 8, 2005.

(51) Int. Cl.
C03B 5/00 (2006.01)
C03B 5/24 (2006.01)

(52) U.S. Cl. ...... 65/134.1; 65/29.1; 65/29.12; 65/134.3; 65/332.1; 65/374.12

(58) Field of Classification Search ............ 65/29.1, 65/29.12, 134.1, 134.3, 32.1
See application file for complete search history.

(56) References Cited

U.S. PATENT DOCUMENTS

| 5,785,726 | A | * | 7/1998 | Dorfeld et al. | 65/134.1 |
| 5,824,127 | A | * | 10/1998 | Bange et al. | 65/90 |
| 6,128,924 | A | * | 10/2000 | Bange et al. | 65/90 |
| 7,000,432 | B2 | * | 2/2006 | Itoh et al. | 65/134.2 |
| 7,358,205 | B2 | * | 4/2008 | Narita et al. | 501/66 |
| 7,475,568 | B2 | * | 1/2009 | Bookbinder et al. | 65/134.9 |
| 7,534,734 | B2 | * | 5/2009 | Ellison | 501/66 |
| 7,628,037 | B2 | * | 12/2009 | Lautenschlaeger et al. | 65/29.12 |

(Continued)

FOREIGN PATENT DOCUMENTS

DE 10138108 2/2003

(Continued)

OTHER PUBLICATIONS

Anonymous, "Glass composition suitable for pressing cavities in glass plates," Research Disclosure, Mason Publication, Hampshire GB, vol. 401, No. 3, Sep. 1997.

*Primary Examiner* — Jason L. Lazorcik
(74) *Attorney, Agent, or Firm* — Kevin M. Able

(57) ABSTRACT

A method of controlling blister formation in a glass melt flowing through a system comprising one or more refractory metal vessels by developing a blister index and determining the critical blister index value. The critical value of the blister index may be used to control the principal variables responsible for blister formation, including the water content of the melt, the concentration of reduced multivalent oxide compounds in the melt, and the hydrogen partial pressure of an atmosphere in contact with the outside surface of the refractory metal vessel. Also disclosed is a minimum partial pressure of hydrogen necessary to produce an essentially blister-free glass article in a glass essentially free of arsenic and antimony.

11 Claims, 3 Drawing Sheets

U.S. PATENT DOCUMENTS

| | | | |
|---|---|---|---|
| 7,628,038 B2 * | 12/2009 | DeAngelis et al. | 65/134.1 |
| 7,628,039 B2 * | 12/2009 | DeAngelis et al. | 65/157 |
| 7,696,113 B2 * | 4/2010 | Ellison | 501/66 |
| 2001/0039812 A1 * | 11/2001 | Romer et al. | 65/134.1 |
| 2004/0043887 A1 | 3/2004 | Paulson | 501/66 |
| 2006/0242995 A1 * | 11/2006 | Bookbinder et al. | 65/134.1 |
| 2006/0242996 A1 | 11/2006 | DeAngelis et al. | 65/134.1 |
| 2007/0149380 A1 * | 6/2007 | Dorfeld et al. | 501/55 |
| 2011/0138858 A1 * | 6/2011 | Dorfeld et al. | 65/29.15 |

FOREIGN PATENT DOCUMENTS

| | | |
|---|---|---|
| EP | 1 512 671 | 3/2005 |

* cited by examiner

METHOD OF ELIMINATING BLISTERS IN A GLASS MAKING PROCESS

This application is a divisional of U.S. application Ser. No. 11/635,975, filed on Dec. 8, 2006, which claims the benefit of priority under 35 U.S.C. §119(e) of U.S. Provisional Application Ser. No. 60/749,024 filed on Dec. 8, 2005, the contents of which are incorporated herein in its entirety by reference.

BACKGROUND OF THE INVENTION

1. Field of the Invention

This invention is directed to a method of forming glasses without blisters in manufacturing processes containing refractory metal systems, and in particular, refractory metal conditioning systems. The invention is particularly useful for, but not limited to, forming high melting or high strain point glasses, such as are used for glass substrates for flat panel display devices, and glasses which are essentially arsenic or antimony-free, in manufacturing processes utilizing refractory metals, such as platinum or platinum alloys, which contact the glass.

2. Technical Background

Manufacture of hard alumino-borosilicate glass, e.g. for flat panel displays, requires low levels of gaseous inclusions (blisters). Advantageously, refractory metal conditioning systems may be used to avoid refractory outgassing in the final stages of melting, where any blister formed will become a defect. Such refractory metal systems (typically Pt or Pt—Rh alloys) are generally considered to be inert in relation to most glasses, and thus not cause any inclusions in the final glass product. However, this is not necessarily valid. Reactions that occur at the metal/glass interface inside the vessels lead to the generation of gaseous inclusion within the glass melt and thus the final glass product (e.g. glass sheet).

One of the more common reactions that occur at the metal/glass interface is the conversion of negatively charged oxygen ions to molecular oxygen which is caused by the thermal breakdown of water and hydroxyl (OH) species in the glass melt. This phenomenon occurs because at the elevated temperatures of glass melting and delivery, a low partial pressure of hydrogen exists in the glass melt. When hydrogen in the glass melt comes in contact with the refractory metal vessel, the hydrogen rapidly permeates out of the vessel and into the atmosphere outside the vessel, depleting the refractory metal/glass interfacial region of the glass melt of hydrogen. Thus, the permeation of hydrogen from within the vessel, through the vessel wall(s) into the atmosphere outside of the vessel increases the free oxygen within the molten glass (glass melt). Thus, in the breakdown of water, for example, for every two moles of hydrogen that leaves the glass melt due to permeation, a mole of oxygen is left behind at the metal/glass interfacial region of the melt. As the hydrogen leaves the glass melt, the oxygen (or the partial pressure of oxygen) increases, leading to the generation of blisters or gaseous inclusions within the melt.

The hydrogen permeation rate through the walls of the refractory metal vessel, and, therefore, the generation rate of neutral molecular oxygen at the refractory metal/glass melt interface, is proportional to the difference between the square roots of the external and internal hydrogen partial pressures.

Additionally, there are other reactions which involve the catalyzing or oxidation of other species in the glass melt, such as halogens (Cl, F, Br), that can lead to the generation of gaseous inclusions. Further, electrochemical reactions can occur at the metal/glass interface. These electrochemical reactions can be associated with thermal cells, galvanic cells, high AC or DC current applications and grounding situations.

For some applications, blisters in the glass drawn from the glass manufacturing system may pose little problem, and may, under some circumstances, provide aesthetic value. However, in the manufacture of glass substrates for use in the manufacture of flat panel display devices such as liquid crystal displays (LCD) and organic light emitting diode (OLED) displays, blistering makes the resultant glass substrate (sheet) unusable. Therefore, there is tremendous advantage to a process which mitigates against the presence of gaseous inclusions.

Today, there are several known methods that can be used to address the foregoing reactions which cause the formation of blisters in the glass melt. One known method that can be used to help minimize the formation of gaseous inclusions in the finished glass product involves the use of fining agents in the glass melting and conditioning stages. Fining agents are multivalent oxygen-containing compounds that release or absorb oxygen based on temperature.

Arsenic is among the highest temperature fining agents known, and, when added to the molten glass batch material, it allows for $O_2$ release (reduction) from the glass melt at high melting temperatures (e.g. above 1450° C.). This high temperature $O_2$ release, which aids in the removal of gaseous inclusions during the melting and fining stages of glass production results in a glass product (e.g. glass sheet), that is essentially free of gaseous inclusions. Furthermore, any residual oxygen is reabsorbed by the fining agent during the transition from a reduced state to an oxidized state as the glass cools.

Unfortunately, from an environmental point of view, arsenic is considered a hazardous material, and therefore undesirable as a fining agent. Other, less effective fining agents are available, such as antimony and tin, but antimony is also environmentally undesirable, and tin much less effective than either arsenic or antimony.

The need to eliminate environmentally unfavorable but effective fining agents, such as arsenic and antimony, in order to remove gaseous inclusions in the glass melt has required the use of less effective fining agents, and placed greater emphasis on addressing the generation of gaseous inclusions.

There are other methods available to mitigate reactions that lead to the formation of gaseous inclusions in the glass. U.S. Pat. No. 5,785,726, for example, discloses a humidity controlled enclosure that surrounds one or more platinum-containing vessels and is used to control the partial pressure of hydrogen outside the vessel(s) so as to reduce the formation of gaseous inclusions. The breakdown of the water in the moisture-laden atmosphere within the enclosure produces hydrogen which in turn helps to suppress the aforementioned hydrogen permeation. Although the enclosure described in U.S. Pat. No. 5,785,726 successfully reduces the formation of gaseous inclusions, it has several drawbacks. First, the enclosure is so large that it makes it difficult if not impossible to maintain a uniform environment around the platinum-containing components of the glass making apparatus. Second, the environment within the enclosure is so hot and humid that it can be uncomfortable to people that must work within the enclosure. U.S. patent application Ser. No. 11/116,669 improved upon the traditional enclosure described in U.S. Pat. No. 5,785,726, disclosing encapsulating the refractory metal components of a glass making apparatus within a relatively tight fitting enclosure (capsule). Use of a capsule allows improved control of the atmosphere within the relatively small volume between the capsule and the encapsulated glass-carrying refractory metal components. This is due to the fact that a probe reading (such as relative humidity or dew point temperature) for conditions inside the capsule is more likely to be representative of conditions at the exterior surfaces of the refractory metal glass processing equipment than measurements taken within the large volume of space within the prior large, room-sized enclosure. Additionally, if there is a process instability or change in the water content of the molten glass within the refractory metal vessel(s) that leads to an increase in hydrogen permeation blistering, then there is often no way to respond to this problem using the conventional enclosure disclosed in U.S. Pat. No. 5,785,726 since it may be operating at its maximum dew point. Moreover, response time of the capsule of U.S. patent application Ser. No. 11/116,669 to process instabilities is greatly enhanced owing to the small volume contained between the capsule and the refractory metal vessel(s) compared to the conventional enclosure. That is, the changes in the humidity (dew point) within the capsule volume, and therefore the hydrogen partial pressure, can be performed much more rapidly than would be possible in a room-sized enclosure.

Nevertheless, in spite of the improvements in hydrogen permeation blister control represented by the methods described above, they are based entirely on the water content of the glass, and control of the moisture content of the atmosphere surrounding the refractory metal vessels comprising the glass manufacturing apparatus. Moreover, these methods have to date been empirical in nature, and therefore applied with a large dose of guesswork with regard to the partial pressure of hydrogen necessary to suppress blister formation. It would be beneficial if hydrogen permeation blistering control could be undertaken with a more complete understanding of the impact of other blistering factors, such as the total concentration of multivalent oxygen-containing compounds within the glass. This has become particularly important as, for environmental reasons; the total concentration of multivalent compounds introduced into the glass batch has been decreased.

SUMMARY

In one broad aspect of the present invention, a method of making a glass article is disclosed comprising flowing a molten glass at a temperature of at least about 1550° C. in a vessel comprising a refractory metal wall having an inside surface in contact with the molten glass, and wherein a partial pressure of hydrogen at an outside surface of the refractory metal wall is at least about $10^{-6}$ bar, forming the molten glass into the glass article, and wherein the glass article comprises a total concentration of reduced multivalent compounds equal to or less than about 0.04 mole % and a $\beta_{OH}$ of at least about 0.4 $mm^{-1}$.

According to another embodiment, a method of making a glass article is presented comprising flowing a molten glass at a temperature of at least about 1550° C. in a vessel comprising a refractory metal wall having an inside surface in contact with the molten glass, and wherein a partial pressure of hydrogen at an outside surface of the refractory metal wall is at least about $10^{-6}$ bar; forming the molten glass into the glass article, and wherein the glass article comprises a $\beta_{OH}$ of at least about 0.4 $mm^{-1}$, a total concentration of SnO and SnO2 less than or equal to 0.112 mole %, and a total concentration in the glass article of all other multivalent compounds not comprising tin is less than or equal to about 0.04 mole %.

In accordance with still another broad aspect of the invention, a method of making a glass article is disclosed comprising flowing a molten glass at a temperature of at least about 1550° C. in a vessel comprising a refractory metal wall having an inside surface in contact with the molten glass, and wherein a partial pressure of hydrogen ($pH_2$) in bar at an outside surface of the refractory metal wall is greater than or equal to an amount calculated according to the expression $pH_2 = 2.39 \times 10^{-4} \beta_{OH}^2 - 1.81 \times 10^{-4} \beta_{OH} + 3.52 \times 10^{-5}$ bar, forming the molten glass into the glass article; and wherein the glass article comprises a $\beta_{OH}$ of at least about 0.4 $mm^{-1}$ and a total of no more than about 0.04 mole % of reduced multivalent compounds.

In yet another embodiment according to the present invention, a method of making a glass article is described comprising melting a batch material comprising a multivalent compound to form a glass melt, flowing the glass melt through a refractory metal vessel, an atmosphere in contact with an outside surface of the refractory metal vessel comprising a partial pressure of hydrogen $pH_2$, forming a glass article from the glass melt, the glass article comprising a concentration of a reduced multivalent oxide compound and a water content expressed as $\beta_{OH}$, calculating a blister index from the reduced multivalent oxide compound concentration, the $\beta_{OH}$ concentration and the partial pressure of hydrogen and maintaining the blister index below a predetermined value by controlling the multivalent oxide compound in the batch material, the water content, or the partial pressure of hydrogen, or a combination thereof.

Also disclosed in a method of making a glass comprising flowing a molten glass at a temperature of at least about 1550° C. in a vessel comprising a platinum or platinum alloy wall having an inside surface in contact with the molten glass, and wherein a partial pressure of hydrogen at an outside surface of the platinum or platinum alloy wall is at least about $10^{-6}$ bar, and wherein the resultant glass comprises a total concentration of reduced multivalent compounds equal to or less than about 0.04 mole %, a $\beta_{OH}$ of at least about 0.4 $mm^{-1}$ and no more than 0.2 gaseous inclusions per pound of glass.

Also disclosed is a glass sheet comprising a total tin content expressed as $SnO_2$ that is less than or equal to about 0.112 mole %, a total arsenic content expressed as $As_2O_3$ that is less than or equal to about 0.016 mole %, a total antimony content expressed as $Sb_2O_3$ that is less than or equal to 0.011 mole %, a total iron content expressed as $Fe_2O_3$ that is less than or equal to about 0.037 mole % and wherein the glass sheet contains no more than about 0.2 gaseous inclusions per pound of glass.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
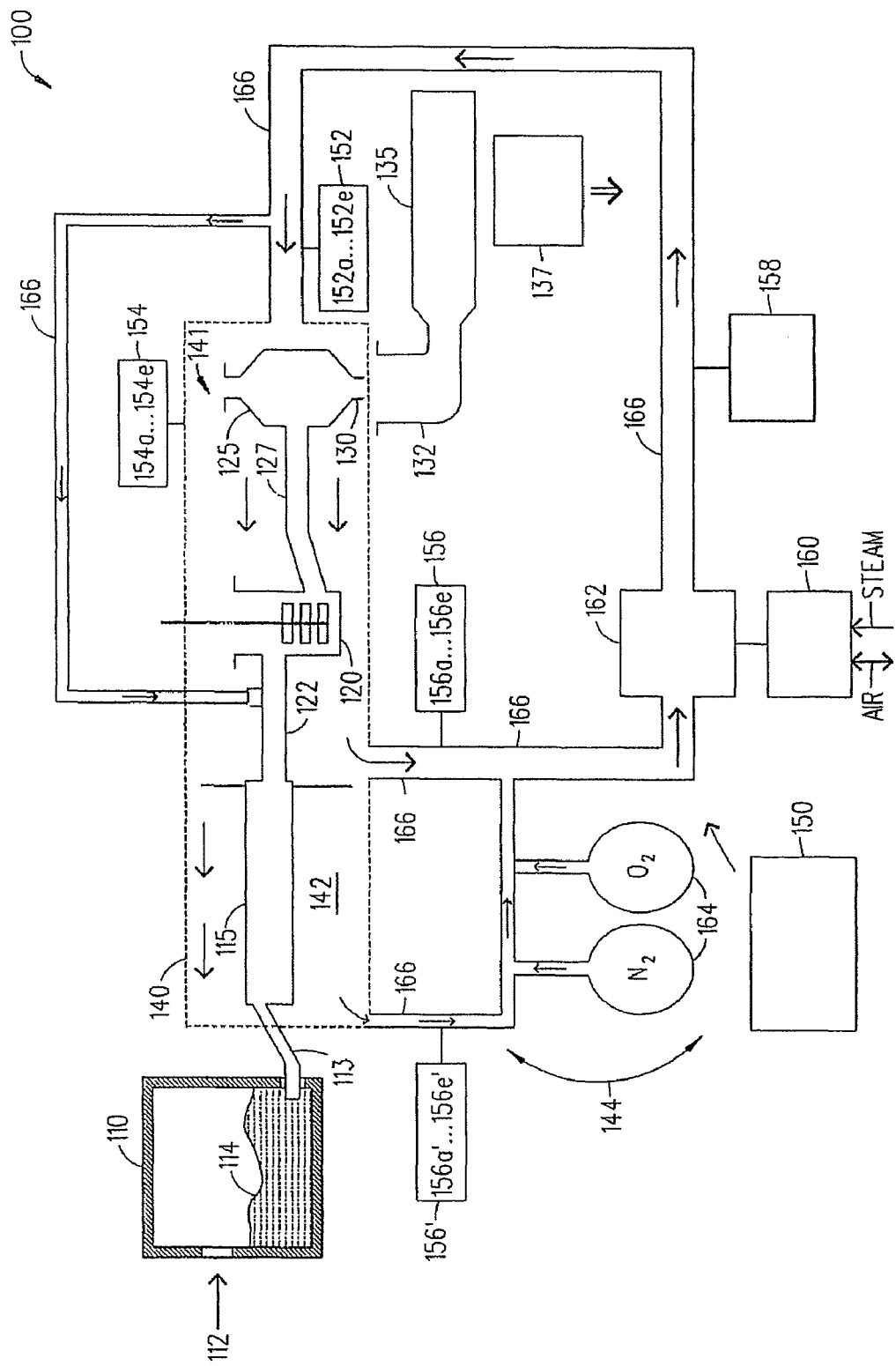
FIG. 1 is a schematic view that shows the components of a glass manufacturing system in accordance with an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

The present invention relates to a method of melting and forming glasses in a manufacturing system containing glass-contacting metals. Metals used to contact glass in a glass manufacturing system must be capable of withstanding the high melting temperatures of various glasses without structural failure, while at the same time minimizing the release of contaminants into the glass by, for example, oxidation of the metal. Such metals are typically chosen from the platinum group, i.e. iridium, osmium, palladium, platinum, rhodium, and ruthenium, or alloys thereof, either with each other, or other metals, such as, for example, molybdenum, tin, antimony, silver, gold and iron. These high melting temperature metals and/or alloys will hereinafter be referred to as refractory metals. The present invention is particularly beneficial for, but not limited to, the making of glass containing essentially no antimony or arsenic, i.e. essentially arsenic or antimony free.

While not wishing to be bound by theory, it is believed that the blistering effect which occurs in refractory metal vessels, such as a platinum or platinum alloy fining vessel, for example, occurs as a result of formation of an oxygen-rich layer of glass melt at the refractory metal-glass melt interface. This oxygen-rich layer in the glass is believed to be produced by a combination of thermoelectric electrolysis of the melt, reduction of oxide fining agents (i.e. multivalent oxide compounds), and the number of hydroxyl (OH) groups dissolved in the glass. The last effect is believed to have a large impact on the rate of blistering as a result of contact of the glass with the refractory metal. It is believed that OH groups dissociate to some extent into neutral hydrogen and oxygen. The hydrogen can then permeate through the refractory metal wall, enriching the interface region (refractory metal-contacting region) of the glass with oxygen which can then form bubbles (seeds or blisters) if the oxygen solubility limit of the glass is exceeded. Thus, by controlling the relative partial pressure of hydrogen outside the refractory metal system versus that inside the refractory metal system, and more specifically, within the glass melt, hydrogen permeation through the refractory metal can be controlled, thereby minimizing or eliminating blister formation.

Referring to FIG. 1, there is shown a schematic view of an exemplary glass manufacturing system 100 that uses the fusion process to make glass sheets 137 in accordance with the present invention. In the fusion process, a molten glass is flowed into a wedge shaped, open-topped pipe (often referred to as an isopipe). The glass overflows the pipe in two separate flows. The separate flows join, or fuse, at the lower apex of the wedge-shaped pipe to form a glass ribbon which is later cut into individual glass sheets. The fusion process finds considerable use in the manufacture of glass substrates for the display glass industry. However, while a fusion process is shown, it will be appreciated that the present invention is useful anytime a molten glass is flowed through or contained within a refractory metal vessel (e.g. platinum or a platinum alloy) and has a low complement of multivalent ions, but for which a low concentration of blisters is desired. For example, a glass article may be formed using the well-known float process using the teachings of the present invention. Another suitable method of forming a glass article in accordance with the present invention is the so called slot draw method.

The glass manufacturing system 100 includes a melting vessel 110 in which batch materials are introduced as shown by arrow 112 and then melted to form molten glass 114. The melting vessel 110 is typically made from a refractory material, typically a ceramic refractory material. The glass manufacturing system 100 further includes components that are made from a refractory metal, typically platinum or a platinum containing alloy such as Pt—Rh, Pt—Ir, etc. and combinations thereof. The refractory metal components include a melting tank (melter) to finer connection tube 113, fining vessel 115 (e.g. finer tube 115), a mixing vessel 120 (e.g. stir chamber 120), a finer to stir chamber connecting tube 122, a delivery vessel 125 (e.g. bowl 125), a stir chamber to bowl connecting tube 127, a downcomer 130 and an inlet 132. The inlet 132 is coupled to forming vessel 135 (e.g. isopipe 135) which forms the glass sheet 137. Typically, the totaling vessel 135, similar to the melting tank, is made from a refractory material, and in particular a refractory ceramic material.

In one embodiment of the present invention, the melting/delivery system 141, which includes vessels 115, 120, 125 and tubes 122, 127 and 130, is encapsulated or encased with a capsule 140. A jacket volume 142 is defined between the interior walls of the capsule 140 and the exterior walls of components 115, 120, 122, 125, 127 and 130 in the melting/delivery system 141. The capsule 140 is preferably leak tight to the extent that it may be used for maintaining a slightly more positive pressure of low oxygen, moist atmosphere inside the jacket volume 142 that is greater than ambient conditions. As shown, capsule 140 can be made as one zone which encloses the entire length of the melting/delivery system 141. Alternatively, multiple capsules 140 can be used as multiple zones where a plurality of individual capsules 140 enclose one or more of the vessels 115, 120, 125 and tubes 122, 127 and 130. An advantage of using multiple capsules 140 is the ability to independently control the atmosphere in a particular area of the melting/delivery system 141.

The present invention may also include a closed-loop control system 144 that controls the environment/atmosphere within capsule 140 and prevents the aforementioned reactions from occurring at the refractory metal/glass interface inside components 115, 120, 122, 125, 127 and 130. Again, the aforementioned reactions lead to the formation of gaseous inclusions in the glass sheet 137. In addition, the aforementioned reactions with the refractory metal vessels and tubes can lead to failure of the refractory metal components 115, 120, 122, 125, 127 and 130.

In particular, the closed loop control system 144 controls the atmosphere inside capsule 140 so as to suppress undesirable reactions at the metal/glass interface by causing the migration of hydrogen from outside the refractory metal components into the glass/refractory metal interface. A controlled level of hydrogen permeation into the glass/refractory metal interface reduces the production of undesirable species such as molecular oxygen, and halogens, within the glass which in turn prevents the formation of undesirable gaseous inclusions in the molten glass 114. Hydrogen permeation into the glass/refractory metal interface is achieved by supplying a higher partial pressure of hydrogen to the exterior surfaces (non-glass contact surfaces of the refractory metal vessel) in the mixing/delivery system 141, relative to the interior glass/refractory metal interfaces. To accomplish this, a humid, low oxygen atmosphere that results in a controlled level of hydrogen at the non-glass contact surface of the refractory metal system may be maintained inside capsule 140. It should be noted that the hydrogen level in the atmosphere inside capsule 140 is undetectable. However, hydrogen is generated when water in the moisture-laden atmosphere breaks down at the high temperatures associated with molten glass 114.

Alternatively, and more preferably, a hydrogen-containing gas may be directly employed to control the hydrogen partial pressure within capsule 140. For example, a mixture of primarily nitrogen gas, with a percentage of hydrogen gas mixed in, could be pumped into the enclosure, the percentage of hydrogen being varied as needed. This later approach has the advantage of a more direct determination of the amount of hydrogen in the capsule atmosphere, and more precise control thereof.

The exemplary closed loop control system 144 includes a controller 150 that obtains sensor readings from one or more sensor locations within and outside capsule 140. These various sensors may be used to determine gas flow rates, gas concentrations, partial pressures and dew point, if needed, in order to control the partial pressure of hydrogen within the capsule atmosphere. The controller 150 processes the sensor measurements and controls different devices like gas or humidity feeds, heating/cooling controls, and so forth. As shown, controller 150 can obtain sensor readings from capsule supply sensors 152, capsule sensors 154 and capsule exit sensors 156 and 156'. In this example, the capsule supply sensors 152 include flow sensor 152a, a dew point/humidity sensor 152b, a temperature sensor 152c, an oxygen sensor 152d and a pressure sensor 152e. The capsule sensors 154 include a flow sensor 154a, a dew point/humidity sensor 154b, a temperature sensor 154c, an oxygen sensor 154d and a pressure sensor 154e. The capsule exit sensors 156 and 156' each include a flow sensor 156a and 156a', a dew point/humidity sensor 156b and 156b', a temperature sensor 156c and 156c', and oxygen sensor 156d and 156d', and a pressure sensor 156e and 156e'.

Controller 150 processes the sensor measurements and controls different devices like humidity feed system 158, heating/cooling control system 160, air handler(s) 162 and $O_2/N_2$ makeup system 164. Air handler(s) 162 have access to air and steam. All of the devices 158, 160, 162 and 164 are connected to a network of pipes 166 which as shown is connected to capsule 140. In operation, controller 150 controls devices 158, 160, 162 and 164 to create an environment/atmosphere inside capsule 140 where the hydrogen which is generated by the decomposition of water vapor is done so at a rate that is equal to or greater than the rate of hydrogen permeation through the refractory metal walls of components 115, 120, 122, 125, 127 and 130 that would be occurring if an ambient atmosphere was present at the non-glass contact surface of the components.

Although the foregoing exemplary control system was described in terms of supplying hydrogen to the capsule volume via the breakdown of water vapor, and thus included a variety of controls and piping necessary to accomplish this goal, the system could be easily modified to supply dry gases, including a hydrogen containing gas, in order to directly control the hydrogen partial pressure within the capsule volume without undue experimentation.

While the generation rate of neutral oxygen gas at the refractory metal-glass melt interface is proportional to the hydrogen permeation rate, analysis of actual glass production data shows that blister formation is also sensitively dependent upon the absolute concentration of reduced multivalent compounds, such as SnO and $As_2O_3$, in the melt, and the amount of water in the glass. It will be understood throughout this description that water, as used herein, is used to denote both molecular water ($H_2$) and the hydroxyl ion (OH). Cations of the aforementioned reduced multivalent species are capable of reacting with neutral oxygen gas and converting it to dissolved oxide complexes of a higher valence state, e.g. $SnO_2$ and $As_2O_5$. Here, the term multivalent cations refers to ionized forms of a multivalent element, such as, but not limited to, iron ($Fe^{2+}$ or $Fe^{3+}$), arsenic ($As^{3+}$ or $As^{5+}$), antimony ($Sb^{3+}$ or $Sb^{5+}$) and tin ($Sn^{2+}$ or $Sn^{4+}$). The concentration of water is most conveniently determined by the cross section of the O—H fundamental stretching mode at approximately 3600 cm$^{-1}$ as measured by IR spectroscopy and expressed as $\beta_{OH}$ in mm$^{-1}$. The presence of reduced multivalent compounds in the glass counteracts at least part of the tendency of hydrogen permeation to form blisters. When the concentration of reduced multivalent compounds is high, or when the concentration of water in the glass melt is low (low $\beta_{OH}$), then the pH$_2$ required in the atmosphere outside the refractory metal vessel to suppress gaseous inclusions is comparatively low. However, when the concentration of reduced multivalent compounds is low or $\beta_{OH}$ is high, the pH$_2$ required to suppress gaseous inclusions is comparatively high. As used herein, pH$_2$ denotes the partial pressure of hydrogen, and in particular, the partial pressure of hydrogen in contact with the non-glass contact surface(s) of the refractory metal vessel containing the molten glass.

For certain environmentally-friendly glasses, so called "green" glasses, such as those glasses which might be used in the manufacture of glass for flat panel display applications, the total concentration of multivalent cations in the glass is intentionally maintained at low levels. For example, in display applications antimony and arsenic is typically maintained at or below 0.05 wt. % (0.016 mole % $As_2O_3$ and 0.011 $Sb_2O_3$) in order to qualify as "green". Iron is preferably maintained at or below 0.08 wt. % (0.033 mole %) to ensure adequate transparency of the glass sheet. Tin is preferably at a low level to avoid precipitation of tin oxide (e.g. cassiterite) during the forming process as the molten glass is being drawn into a glass sheet. At the same time, melting tank sizes are being increased, with increased free surface areas, and the use of gas oxygen burners to melt the batch materials into molten glass, to address increasing production demands, have contributed to higher water levels in the molten glass. The result may be the generation of glass with $\beta_{OH}$ levels in excess of 0.35 mm$^{-1}$, and typically greater than about 0.4 mm$^{-1}$ or in some embodiments greater than about 0.5 mm$^{-1}$. While the addition of chlorine to the batch has been taught as a method of reducing water levels in the molten glass, in practice the high chlorine concentration effluent which is generated in such an approach proves to be a serious pollution abatement challenge that adds considerably to production costs.

It can be appreciated that, due not in small part to environmental and cost concerns, the chemical barriers to blister formation have been largely eliminated from the glass composition, such chemical barriers now being limited to tramp amounts of arsenic and antimony resulting from contaminants in the batch materials themselves, and low levels of iron and tin. At the same time factors involved in increased production demands have contributed to an increase in the overall water content of the glass melt. Thus, a glass making process which incorporates interfaces between the molten glass and a refractory metal may require a significant partial pressure of hydrogen outside the refractory metal vessel to successfully form the glass without gaseous inclusions.

We have found that it is possible to describe the relative impact of the three process variables that largely control hydrogen permeation in a single mathematical expression, making it possible to provide a permeation or "blister index" $I_b$. The three process variables, from the preceding description, are the water content, $\beta_{OH}$, the partial pressure of hydrogen $pH_2$ in the atmosphere in contact with an outside surface of the refractory metal vessel or vessels, and the total concentration of reduced multivalent oxide compounds present in the melt, where the concentrations are denoted by brackets, e.g. [SnO]. The blister index may be calculated for a specific location on the refractory metal system as:

$$I_b = \Delta\sqrt{pH_2} - K\Sigma([SnO],[As_2O_3],[Sb_2O_3],[FeO],\text{etc.}) \quad (1)$$

where K is a constant.

For an actual refractory metal-containing glass manufacturing system, Equation (1) can be expressed as:

$$I_b = (\sqrt{p_{H_2,in}} - \sqrt{p_{H_2,out}}) - K\Sigma a^i[M_i^{b_1+}] \quad (2)$$

where $p_{H_2,in}$ is the $H_2$ partial pressure in the melt (which depends on [OH] through the equation $p_{H2,in} = k[OH]^2$, where the coefficient k must be determined experimentally for each glass composition), $p_{H_2,out}$ is the $H_2$ partial pressure in contact with the non-glass contacting side of the refractory metal, $\Sigma a_i[M_i^{b_1+}]$ is the equivalent molar concentration of reduced multivalent oxide compounds capable of absorbing $O_2$, K is a constant that must be determined experimentally and which accounts for process conditions, the design of the glass making system, the base glass composition, etc. Looking back to Equation (2) again, by running multiple experiments with respect to a given point in the refractory metal portion of the glass making system, one can solve for K and $I_b$.

As indicated by Equation (2), the blister index $I_b$ consists of two terms and depends on the three process variables that control blister formation via hydrogen permeation. The first term, $(\sqrt{P_{H_2,in}} - \sqrt{P_{H_2,out}})$, describes $O_2$ generation on the refractory metal due to hydrogen permeation, while the second term, $K\Sigma a_i[M_i]$, describes $O_2$ absorption by reduced multivalent oxides, M. The $a_i$ coefficients are the number of moles of $O_2$ that can be absorbed by one mole of the reduced multivalent oxide. As can be seen, Equation (2) represents a relationship between oxygen generation and oxygen depletion.

Figure 2:
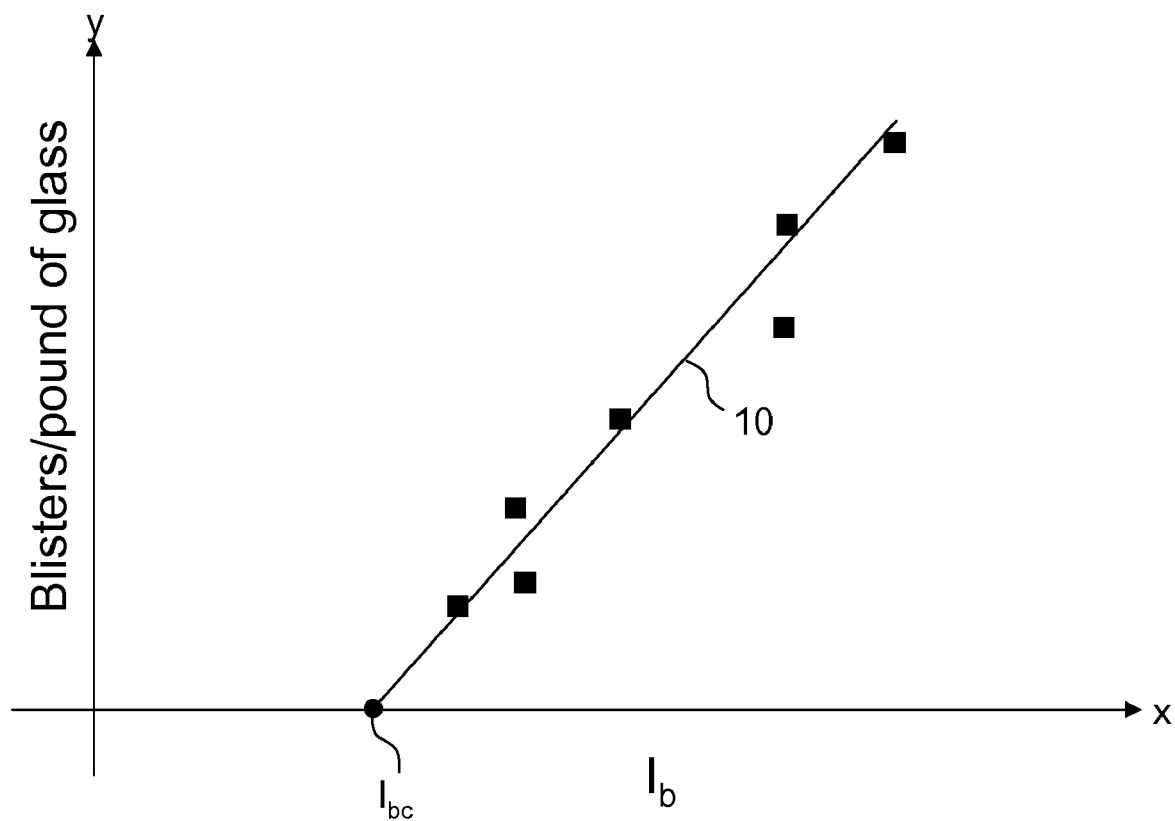
FIG. 2 is an exemplary plot showing a correlation between the number of blisters per pound of glass to the blister index.

A critical value of $I_b$ ($I_{bc}$) serves as a demarcation between acceptable and unacceptable blister production, the acceptable level of blisters being dependent upon the intended application for the glass, customer requirements, etc. $I_{bc}$ is determined for a specific glass melting unit and blister source location from a correlation of blister level and blister index over a range of one or more of the three process variables described supra. The blister concentration for each set of conditions is determined by counting the number of detectable blisters per pound of finished (e.g. drawn) glass. The number of blisters per pound of glass is then plotted against $I_b$ as illustrated in FIG. 2, and a critical value of $I_b$ determined by drawing a line at the acceptable blister level (a horizontal line if blisters per pound of glass is plotted on the vertical y-axis). $I_{bc}$ may then be obtained from the plot by noting the intercept point of the correlation curve 10 (e.g. a best-fit curve to the plotted data) with the acceptable blister level. For example, in the illustrative plot shown in FIG. 2, the acceptable blister level is assumed to be zero detectable blisters per pound of glass, i.e. the x-axis in the figure. Therefore $I_{bc}$ is the value of $I_b$ at the x-axis intercept. In a practical glass making process the number of blisters should be maintained at least equal to or less than about 0.2 blisters per pound of glass, and preferably equal to or less than about 0.02 blisters per pound of glass.

Since blister formation depends on the net $O_2$ production rate at the refractory metal-glass melt interface, the blister index described herein (which accounts for both $O_2$ generation and $O_2$ absorption) will predict blister formation better than hydrogen permeation rate alone (which accounts only for $O_2$ generation). The key is capturing the reduction-oxidation state (redox state) of the melt, i.e. the $O_2$ absorption capacity of the reduced multivalent ions.

Once the critical value of $I_b$ is known, it is possible to predict the conditions required to produce blister-free glass. Of particular utility is the ability to translate an undesirable change in one process variable to a required change in another process variable to maintain blister-free glass. For example, the $I_{bc}$ can be used to determine the increase in the imposed external $pH_2$ required to offset a decrease in the concentration of reduced SnO in the melt. Or, the sand or sands comprising the batch material may be changed (some sands are "drier" than other sands) to control the water content of the glass melt. Alternatively, the method of heating and melting the glass melt may be modified, such as using a gas-air burner as opposed to a gas-oxygen burner. If the source of sand is fixed and the partial pressure is no longer controllable, the multivalent oxide compound content of the glass melt may be modified, for example, by adjusting the amount of multivalent oxide compound (e.g. arsenic oxide, antimony oxide, tin oxide, etc.) added to the initial batch materials. Preferably, the multivalent compound(s) introduced into the batch material results in a finished glass article comprising a total tin content expressed as $SnO_2$ that is less than or equal to about 0.112 mole %, a total arsenic content expressed as $As_2O_3$ that is less than or equal to about 0.016 mole %, a total antimony content expressed as $Sb_2O_3$ that is less than or equal to 0.011 mole %, and a total iron content expressed as $Fe_2O_3$ that is less than or equal to about 0.037 wt. %. However, hydrogen partial pressure is the variable most likely to be controlled, as it represents the most manageable attribute, both in terms of ease of adjustment, and with respect to the speed of impact on blister production.

While the foregoing provides a useful method for the design of a new glass making system, or for setting the process set points for a specific existing system, the previous discussion may be extended such that for a glass that is substantially free of alkalis, arsenic, and antimony, and that includes an interface with a refractory metal at a temperature greater than or equal to about 1550° C., the exterior of the refractory metal vessel must be enclosed in an atmosphere comprising a partial pressure of hydrogen above a predetermined minimum to successfully form glass which is essentially free of gaseous inclusions.

Figure 3:
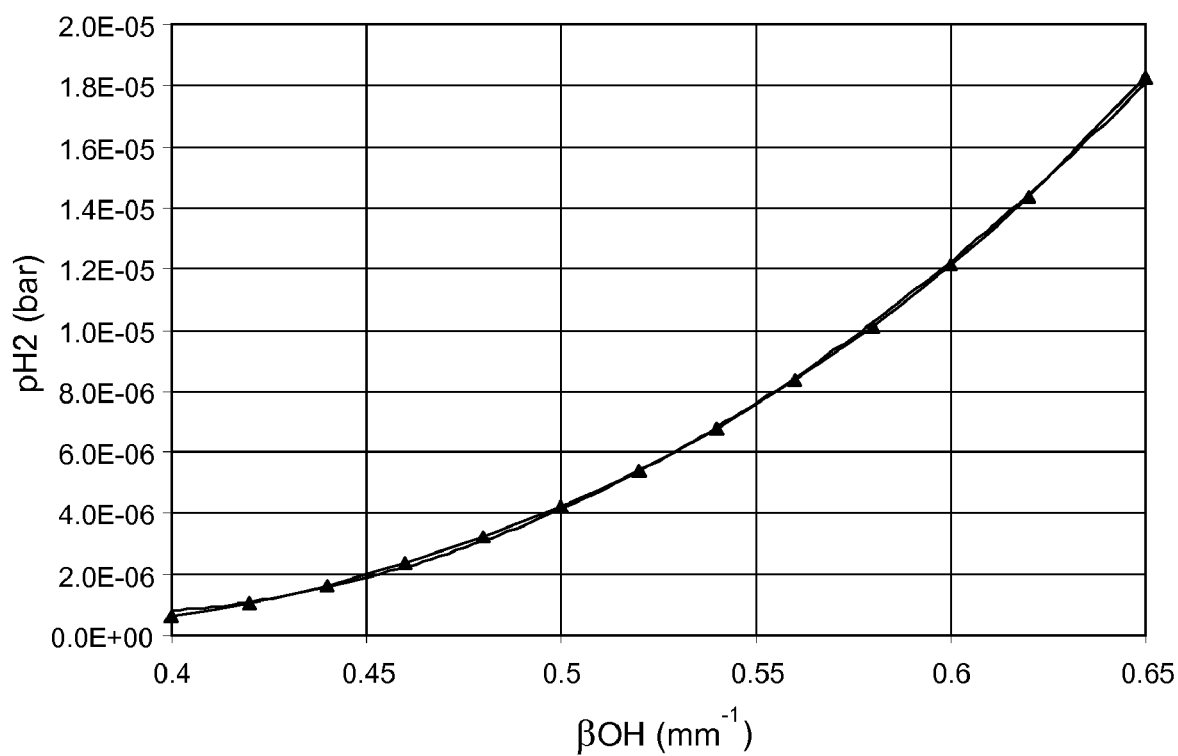
FIG. 3 is an exemplary plot showing a curve denoting the minimum partial pressure of hydrogen as a function of $\beta_{OH}$ in order to minimize gaseous inclusions in the glass.

More fundamentally, the generation and consumption of oxygen within the glass melt may be modeled, and from that modeling the minimum partial pressure of hydrogen in the atmosphere surrounding the refractory metal vessel(s) of the glass making system can be expressed as a function of $\beta_{OH}$ according to the following equation:

$$pH_2 = 2.39 \times 10^{-4} * \beta_{OH}^2 - 1.81 \times 10^{-4} * \beta_{OH} + 3.52 \times 10^{-5} \text{ bars} \quad (3)$$

where $pH_2$ is the minimum partial pressure of hydrogen in the atmosphere surrounding the refractory metal vessel (e.g. within capsule 140) to achieve a gaseous inclusion level of less than or equal to 0.2 inclusions per pound of glass, and $\beta_{OH}$ is as previously defined. Equation (3) is plotted in FIG. 3 for a hypothetical glass composition at a temperature of 1550° C. which is essentially free of arsenic and antimony (a total arsenic concentration expressed as $As_2O_3$ less than or equal to 0.016 mole % and a total antimony concentration expressed as $Sb_2O_3$ less than or equal to about 0.011 mole %) and a $\beta_{OH}$ in the glass melt greater than or equal to about 0.4 $mm^{-1}$, but which may be greater than about 0.5 $mm^{-1}$. Additionally, the glass composition assumed for the plot of FIG. 3 is assumed to contain a total tin concentration expressed as $SnO_2$ of less than about 0.112 mole % and a total iron concentration expressed as $Fe_2O_3$ of less than or equal to about 0.033 mole %. The refractory metal thickness of the vessel containing the molten glass is assumed to be less than or equal to about 1 mm. The thickness of the refractory metal vessel wall is selected as less than or equal to 1 mm for practical reasons: while a thicker refractory metal wall would serve to decrease the hydrogen permeation rate, there is a point at which it becomes prohibitively expensive to manufacture large refractory vessels with thick walls, given that the majority of the refractory metals contain, or are primarily composed of expensive precious metals. Conversely, the wall thickness should be selected to be thick enough that the vessel is capable of supporting itself. The curve displayed in FIG. 3 then represents the critical value of $pH_2$ to suppress blister production. The above assumptions represent a conservative estimate for $pH_2$. That is, process variations serve to increase the $pH_2$ necessary in the atmosphere in contact with the non-glass contact surface of the refractory metal vessel. For example, for temperatures greater than 1550° C., the $pH_2$ necessary in the atmosphere in contact with the non-glass contact surface of the refractory metal vessel in order to suppress blisters also increases. If the concentration of reduced multivalent compounds decreases below the upper limit, the $pH_2$ which is necessary in the atmosphere in contact with the non-glass contact surface of the refractory metal vessel to suppress blister increases. Similarly, if the $\beta_{OH}$ of the glass increases, the $pH_2$ necessary in the atmosphere in contact with the non-glass contact surface of the refractory metal vessel in order to suppress blister increases.

In one embodiment, the glass article produced according to the present invention comprises a total tin content expressed as $SnO_2$ that is less than or equal to about 0.112 mole. %, a total arsenic content expressed as $As_2O_3$ that is less than or equal to about 0.016 mole %, a total antimony content expressed as $Sb_2O_3$ that is less than or equal to 0.011 mole % and a total iron content expressed as $Fe_2O_3$ that is less than or equal to about 0.037 mole %.

In accordance with FIG. 3, for a given $\beta_{OH}$ in the molten glass, a minimum $pH_2$ for the atmosphere surrounding the non-glass contact surface of the refractory metal vessel can be easily determined from the plotted curve. That is, as long as one maintains the $pH_2$ surrounding a refractory metal vessel above and to the left of the curve in FIG. 3, blister production in the molten glass can be suppressed, i.e. maintained less than about 0.2 bubbles (inclusions) per pound of glass, preferably below 0.02 inclusions per pound of glass.

The above explanation can be expanded further with the understanding that one may consider not only the upper limits for arsenic, antimony, tin and iron, but all multivalent species, and instead specify a maximum limit for the total concentration of all multivalent species. In this instance it is appropriate to consider the total concentration of reduced multivalent species.

The total concentration of reduced multivalent species can be determined by summing the mole percent of each reduced multivalent compound, wherein each mole % is multiplied by the number of molecules of $O_2$ absorbed by the particular compound, to wit, the total molar concentration of the reduced multivalent compounds=1*(mole % $As_2O_3$)+1*(mole % $Sb_2O_3$)+0.5*(mole % $SnO+0.25$*(mole % FeO)+0.5*(mole % $CeO_2$)+ . . . . More generically, the preceding equation may be written as Total Reduced Multivalent Compounds=$\Sigma(n_i[M_i])$ between 1 and i, where i represents the number of reduced multivalent species present in the glass, $[M_i]$ represents the concentration of the $i^{th}$ reduced multivalent compound, and $n_i$ represents the number of molecules of $O_2$ absorbed when one mole of the $i^{th}$ reduced multivalent compound is oxidized.

A more practical method of determining the total reduced multivalent concentration can be determined from $(W_{glass})$ *$\Sigma n_i([P_i]/W_i*U_i)$ where $W_{glass}$ the average molecular weight of the glass in units of g/mole, $n_i$ is as previously defined, $[P_i]$ is the total concentration of the $i^{th}$ multivalent compound in wt. %, U is the mole fraction of the $i^{th}$ multivalent compound in the reduced state and $W_i$ is the total molecular weight in g/mole of the $i^{th}$ multivalent compound. The summation is performed between the ranges of 1 and i, where again i represents the number of multivalent compounds present in the glass. U can be determined as $(X_r/X_r+X_o)$ where $X_r$ is the molar concentration of the $i^{th}$ reduced multivalent compound, and $X_o$ is the molar concentration of the $i^{th}$ oxidized multivalent compound.

In a practical glass making system it is difficult if not impossible to determine the actual concentration of reduced or oxidized multivalent compounds in the 1550° C. molten glass, or the $\beta_{OH}$ of the molten glass. Thus, for a practical glass making system in accordance with the foregoing discussion, Equation (3) and FIG. 3 may be interpreted in the following manner: for a glass article formed from a molten glass processed in a refractory metal vessel or vessels at a temperature in excess of 1550° C., and wherein the glass of the glass article comprises a $\beta_{OH}$ greater than or equal to about 0.4 $mm^{-1}$, and the glass of the glass article further comprises a total reduced multivalent concentration of less than or equal to 0.04 mole %, the minimum $pH_2$ in contact with the non-glass-contacting surface of the refractory metal vessel (e.g. fining tube 115) should be greater than about $10^{-6}$ bar. Under these conditions, the glass of the glass article may be formed comprising no more than about 0.2 bubbles (inclusions) per pound of glass. It should be noted that if the total multivalent concentration of the glass is considered, as opposed to just the reduced species (e.g. SnO, FeO, $As_2O_3$, $Sb_2O_3$, $CeO_2$, etc.) the limit on multivalent concentration in the formed glass will be greater than 0.04 mole %. It should also be appreciated that the concentration of reduced multivalent compounds in the formed glass article is substantially the same as the concentration of reduced multivalent compounds in the molten glass. This occurs for the following reason: As the multivalent compound is heated in the molten glass, the compound is reduced and releases oxygen. If the reduction takes place in fining (conditioning) tube 115, for example, the oxygen, which joined a bubble, travels to a free surface of the molten glass and is eliminated from the molten glass. As the molten glass continues through the refractory metal system (beyond the fining vessel), the glass, and the multivalent compound, cool. Although in the presence of free oxygen the multivalent compound would oxidize, substantially all of the free oxygen was previously eliminated, and the compound remains in a reduced state. In practice, the concentration of water, expressed through $\beta_{OH}$, also does not change appreciably during processing of the glass within the refractory metal system and therefore may be measured in the resultant glass article and be representative of the $\beta_{OH}$ concentration in the molten glass during its transit in the refractory metal system, and in particular, after conditioning in the fining vessel.

In practice, many tanks for melting the batch materials in the manufacture of glass are electrically heated, and comprise tin electrodes. The electrodes slowly dissolve, leading to higher tin concentrations in the melt. The foregoing limits on multivalent compounds (as opposed to reduced multivalent compounds) may be modified to accommodate higher tin levels such that a maximum tin concentration (i.e. the sum of both the reduced and oxidized species, SnO and $SnO_2$, respectively), may be established between 0.01 mole % and 0.112 mole %. The maximum concentration of all other multivalent compound, that is all other non-tin containing multivalent compounds, may nevertheless be maintained at less than or equal to about 0.04 mole %.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of making a glass article comprising:

melting a batch material comprising at least one multivalent oxide compound to form a glass melt having a total concentration of reduced multivalent oxide compound(s) and a water content;

flowing the glass melt through a vessel comprising a platinum group metal, an atmosphere in contact with an outside surface of the vessel comprising a partial pressure of hydrogen $pH_2$;

forming a glass article from the glass melt, the glass article comprising a concentration of a reduced multivalent oxide compound, a water content expressed as $\beta_{OH}$, and a number of blisters per pound of glass;

calculating a blister index ($I_b$), from the reduced multivalent oxide compound concentration, the $\beta_{OH}$ concentration and the partial pressure of hydrogen according to the equation:

$$I_b = (\sqrt{pH_{2,in}} - \sqrt{pH_{2,out}}) - K\Sigma a_i [M_i^{b1+}]$$

where $pH_{2,in}$ is the $H_2$ partial pressure in the melt, $pH_{2,out}$ is the $H_2$ partial pressure in contact with the non-glass contacting side of the platinum group metal, and $K\Sigma a_i [M_i^{bT+}]$ is the equivalent molar concentration of reduced multivalent oxide compounds capable of adsorbing $O_2$ wherein $[M_i]$ is the concentration of reduced multivalent oxide i, $a_i$ is the number of moles of $O_2$ that can be adsorbed by one mole of the reduced multivalent oxide i, and K is a constant determined experimentally;

repeating the melting, the flowing, the forming, and the calculating steps over a range of one or more process variables selected from the group consisting of the water content of the glass melt, the partial pressure of hydrogen in the atmosphere in contact with an outside surface of the vessel, and the total concentration of reduced multivalent oxide compounds in the glass melt;

determining a relationship between the number of blisters per pound of glass and the blister index ($I_b$) to thereby calculate a critical value of the blister index ($I_{bc}$) over the range of process variables; and maintaining the blister index ($I_b$) below the critical value of the blister index ($I_{bc}$) by controlling the multivalent oxide compound in the batch material, the water content in the glass batch, and the partial pressure of hydrogen, or a combination thereof according to the determined relationship.

2. The method according to claim 1, wherein the partial pressure of hydrogen is controlled by controlling an effective dew point of the atmosphere.

3. The method according to claim 1, wherein the partial pressure of hydrogen is controlled by varying a concentration of a hydrogen containing gas in the atmosphere.

4. The method according to claim 1, wherein the glass melt is essentially free of arsenic or antimony.

5. The method according to claim 1, wherein the multivalent oxide compound comprises tin.

6. The method according to claim 1, wherein the glass article comprises:

a total tin content expressed as $SnO_2$ that is less than or equal to about 0.112 mole %;

a total arsenic content expressed as $As_2O_3$ that is less than or equal to about 0.016 mole %;

a total antimony content expressed as $Sb_2O_3$ that is less than or equal to 0.011 mole %;

a total iron content expressed as $Fe_2O_3$ that is less than or equal to about 0.037 mole %.

7. The method according to claim 1, wherein the glass article comprises no more than about 0.2 gaseous inclusions per pound of glass.

8. The method according to claim 1, wherein the glass article comprises no more than about 0.02 gaseous inclusions per pound of glass.

9. The method according to claim 1, wherein the $\beta_{OH}$ of the glass article is greater than 0.5 $mm^{-1}$.

10. The method according to claim 1, wherein a total concentration of reduced multivalent compounds in the glass article is less than 0.04 mole %.

11. The method according to claims 1, wherein the partial pressure of hydrogen in contact with the outside surface of the vessel is at least $10^{-6}$ bar.

* * * * *